United States Patent
Kim et al.

(10) Patent No.: US 7,239,228 B2
(45) Date of Patent: Jul. 3, 2007

(54) APPARATUS FOR MEDIATING COMMUNICATION BETWEEN CONTROLLER AND TRANSPONDERS OF MANY MOVING OBJECTS AND METHOD FOR CONTROLLING THE SAME

(75) Inventors: Jong-Ho Kim, Uiwang-Si (KR); Yong-Deak Kim, Seongnam-Si (KR)

(73) Assignee: Digitalsis Inc. (KR)

( * ) Notice: Subject to any disclaimer, the term of this patent is extended or adjusted under 35 U.S.C. 154(b) by 672 days.

(21) Appl. No.: 10/458,494

(22) Filed: Jun. 9, 2003

(65) Prior Publication Data
US 2003/0231105 A1    Dec. 18, 2003

(30) Foreign Application Priority Data
Jun. 11, 2002    (KR) .................... 10-2002-0032691

(51) Int. Cl.
*H04Q 5/22*    (2006.01)
*H03C 1/52*    (2006.01)
*H04B 1/02*    (2006.01)

(52) U.S. Cl. .................. 340/10.2; 340/10.4; 340/10.5; 340/905; 455/106

(58) Field of Classification Search ............... 340/10.2, 340/10.4, 825.54, 905, 933, 928, 382, 539; 364/464, 401; 455/106; 235/384; 370/230, 370/236, 280–282, 468
See application file for complete search history.

(56) References Cited

U.S. PATENT DOCUMENTS

| | | | | |
|---|---|---|---|---|
| 5,675,494 A | * | 10/1997 | Sakurai et al. ............... | 705/417 |
| 5,757,285 A | * | 5/1998 | Grabow et al. ............. | 340/928 |
| 5,926,546 A | * | 7/1999 | Maeda et al. ................. | 705/65 |
| 5,952,940 A | * | 9/1999 | Matsumoto ................. | 340/905 |
| 5,963,149 A | * | 10/1999 | Nagura et al. ............... | 340/933 |
| 6,081,718 A | * | 6/2000 | Ando et al. ................. | 455/447 |
| 6,411,889 B1 | * | 6/2002 | Mizunuma et al. ......... | 701/117 |
| 6,708,085 B2 | * | 3/2004 | Yamane et al. ................ | 701/1 |
| 7,005,985 B1 | * | 2/2006 | Steeves ................... | 340/572.1 |

* cited by examiner

*Primary Examiner*—Wendy R. Garber
*Assistant Examiner*—Nam Nguyen
(74) *Attorney, Agent, or Firm*—Cantor Colburn LLP

(57) ABSTRACT

Disclosed are a communication mediation apparatus and a method for controlling the same for performing communication mediation while reducing a communication miss rate caused by collision of data. A performance of a moving object recognition system unavoidably varies with the number of moving objects to be recognized by a controller, and with a mediation parameter for use in a communication mediation algorithm. The apparatus/method dynamically varies a mediation parameter according to a difference in numbers of many moving objects, thus reducing a communication miss rate regardless of the difference (i.e., traffic volume variation) in numbers of the moving objects.

10 Claims, 13 Drawing Sheets

APPARATUS FOR MEDIATING COMMUNICATION BETWEEN CONTROLLER AND TRANSPONDERS OF MANY MOVING OBJECTS AND METHOD FOR CONTROLLING THE SAME

BACKGROUND OF THE INVENTION

1. Field of the Invention

The present invention relates to a communication mediation apparatus and a method for controlling the same, and more particularly to an apparatus and method for performing communication mediation while reducing a communication miss rate caused by collision of data.

2. Description of the Related Art

There have been widely used systems for recognizing a plurality of moving objects by allowing a single controller to communicate with transponders of the moving objects, for example, an automatic charging system, a system for managing domestic animals, and a system for managing stored goods, etc.

There have been proposed a variety of communication mediation methods for performing communication mediation to reduce a communication miss rate caused by collision of data in the above-identified systems, for example, a mediation algorithm for adapting a unique number assigned to each transponder, another mediation algorithm for adapting a random delay count value, and a persistence-mediation algorithm, etc.

The mediation algorithm for use with the random delay count value and the persistence-mediation algorithm will hereinafter be described in detail with reference to vehicles and roadside controllers (RS-Cs).

The mediation algorithm for use with the random delay count value uses a random number generator or counter built in an in-vehicle device such as a transponder in such a way that it solves a data collision problem caused when more than two vehicles generate response signals at the same time. In more detail, in the case where a transponder transmits a response packet to reply to a control signal received from the roadside controller, and no acknowledge signal is then received from the roadside controller within a predetermined time (i.e., if it is determined that data collision occurs), the mediation algorithm for use with the random delay count value generates random numbers according to a mediation parameter (e.g., a maximum count value) contained in the control signal received from the roadside controller, counts the random numbers to create a delayed time, and then retransmits a response packet.

FIG. 1 is a conceptual diagram illustrating a mediation algorithm for use with such a random delay count value.

A roadside controller transmits a control signal for every downlink timeslot "b" within a communicable range. In the case where each uplink timeslot "a" receives an accurate response signal having no error, i.e., in the case where communication interferences or response signals simultaneously created by many vehicles are not generated, the next downlink timeslot transmits an acknowledge (ACK) signal. The reason why the next downlink timeslot transmits the ACK signal is to allow a vehicle sending the above response signal not to answer the next control signal.

Vehicles, i.e., a vehicle A, a vehicle B, a vehicle C, a vehicle D, and a vehicle F, enter their communicable ranges, respectively, and receive control signals from the roadside controller (not shown) in downlink timeslots 101, 109 and 113. The vehicles A, B, C, D and F transmit response signals to the roadside controller in uplink timeslots 103, 111 and 115. Black-colored dots shown in the uplink timeslots 103, 111 and 115 represent the fact that vehicles transmit their response signals.

Referring to FIG. 1, the vehicles A, B and C enter a communicable range at the same time, such that data collision occurs among response signals of the vehicles as shown in a reference number 103 of FIG. 1. Therefore, the roadside controller receives an erroneous response signal so that The ACK signal is not transmitted in the downlink timeslot 105.

Because the vehicles A, B and C do not receive the ACK signal within a predetermined time denoted by a timeslot 103, the vehicles A, B and C generate random numbers according to a mediation parameter (i.e., a maximum count value) contained in the received control signal, count the random numbers to create a delayed time, and then retransmit response signals.

The vehicle A retransmits a response signal in the uplink timeslot 107 by referring to the above time delay result. Because vehicles other than the vehicle A do not transmit response signals in the timeslot 107, the roadside controller receives a response signal having no error. But, not only vehicles B and C but also a vehicle F entered from the timeslot 113 transmit response signals in the uplink timeslot 115 at the same time, resulting in data collision in the uplink timeslot 115.

As stated above, if vehicles do not receive ACK signals within a predetermined time after transmitting their response signals, the vehicles create a delay time using a mediation parameter (i.e., a maximum count value) contained in a control signal, and then repeatedly retransmit the response signal. As a result, the vehicle B successfully transmits a response signal in an uplink timeslot 127, and the vehicle F successfully transmits a response signal in an uplink timeslot 131.

On the other hand, FIG. 1 shows a random delay count value algorithm for enabling a vehicle to immediately transmit a response signal when the vehicle receives an initial control signal. There has also been proposed another random delay count value algorithm for creating random numbers after a vehicle receives an initial control signal, creating a delay time by allowing the vehicle to wait for timeslots corresponding to the created random numbers, and allowing the vehicle to transmit a response signal.

The persistence-mediation algorithm determines whether a vehicle receiving a control signal can transmit a response signal on the basis of the value of a created random number. For example, a vehicle receiving a control signal creates random numbers from 0 to 999. If the created random number is beyond a predetermined random number 500, the vehicle waits for the next control signal. If the created random number is lower than the predetermined random number 500, the vehicle immediately transmits a response signal. In this case, the predetermined random number 500 functions as a threshold value needed to determine whether the vehicle transmits the response signal, and is also called a persistence value (i.e., a mediation parameter).

The above-identified communication mediation algorithm is characterized in that successful communication is performed on the condition that only one moving object transmits a response signal in one uplink timeslot, and data collision in communication occurs on the condition that more than two moving objects transmit response signals. Therefore, it is necessary for an appropriate communication mediation algorithm to allow all the moving objects (i.e., transponders) to communicate with a controller within a communicable range in consideration of data collision in communication.

However, a performance (i.e., a communication miss rate) of a conventional communication mediation method for use in the above-identified system for recognizing moving objects varies with the number of moving objects (i.e., traffic volume variation), resulting in deterioration of system reliability.

SUMMARY OF THE INVENTION

Therefore, the present invention has been made in view of the above problems, namely, that performance of a moving object recognition system unavoidably varies with the number of moving objects (e.g., traffic volume variation or variation of numbers of domestic animals) to be recognized by a controller, and with a mediation parameter for use in a communication mediation algorithm, and it is an object of the present invention to provide a communication mediation apparatus and method for dynamically varying a mediation parameter according to a difference in numbers of many moving objects, thus reducing a communication miss rate regardless of the difference (i.e., traffic volume variation) in numbers of the moving objects.

It is another object of the present invention to provide a communication mediation apparatus and method for allowing a control signal to include an optimal mediation parameter having the best performance in arrival rates of current moving objects, and transmitting the control signal to transponders arranged within a communicable range.

It is yet another object of the present invention to provide a communication mediation apparatus and method for enabling a control signal of a controller to include an optimal mediation parameter having the best performance in arrival rates of current moving objects and mediation algorithm information corresponding to the optimal mediation parameter, transmitting the control signal to transponders arranged within a communicable range, and thus enabling the transponders to use the optimal mediation parameter having the best performance in the arrival rates of current moving objects.

It is yet another object of the present invention to provide a communication mediation apparatus and method for allowing a transponder to recognize mediation algorithm information contained in a control signal, and performing a corresponding mediation algorithm to which an optimal mediation algorithm is applied.

It is yet another object of the present invention to provide a communication mediation apparatus and method for adding an operation for checking mediation algorithm information contained in the control signal to an operation of a transponder.

It is yet another object of the present invention to provide a communication mediation apparatus and method which classifies a mediation algorithm into a first mediation algorithm for employing mediation control information (i.e., a mediation parameter and mediation algorithm information) of a current reception control signal on the condition that a transponder does not receive an ACK signal within a predetermined time, and a second mediation algorithm for waiting for the next control signal and then employing mediation control information of the next control signal on the same condition as in the first algorithm, and performing an overall operation step of a transponder in such a way that an operation for checking the mediation algorithm information contained in the control signal is added to operations of the first and second mediation algorithms.

It is yet another object of the present invention to provide a communication mediation apparatus and method for adding a function for checking mediation algorithm information contained in a control signal to an operation step of a transponder, and performing the operation step of the transponder when the mediation algorithm information indicates a random delay count value mediation algorithm based on an immediate transmission scheme.

It is yet another object of the present invention to provide a communication mediation apparatus and method for adding a function for checking mediation algorithm information contained in a control signal to an operation step of a transponder, and performing the operation step of the transponder when the mediation algorithm information indicates a random delay count value mediation algorithm based on a delayed transmission scheme.

It is yet another object of the present invention to provide a communication mediation apparatus and method for adding a function for checking mediation algorithm information contained in a control signal to an operation step of a transponder, and performing the operation step of the transponder when the mediation algorithm information indicates a persistence-mediation algorithm.

In accordance with one aspect of the present invention, the above and other objects can be accomplished by the provision of a communication mediation apparatus for controlling a controller to recognize arrival rates of current moving objects, adding an optimum mediation parameter corresponding to the recognized arrival rates of the moving objects to a control signal, and transmitting the control signal having the optimum mediation parameter.

Therefore, the present invention can dynamically provide each transponder with the optimum mediation parameter according to variation of arrival rates of the moving objects, thus reducing a communication miss rate regardless of the difference (i.e., traffic volume variation) in number of the moving objects.

In accordance with another aspect of present invention, there is provided a communication mediation apparatus for allowing a controller to add information indicating the type of mediation algorithm to which the optimum mediation parameter is applied to the control signal.

Therefore, a transponder can selectively perform a mediation algorithm having the best performance in current arrival rates of moving objects.

In accordance with still another aspect of present invention, there is provided a communication mediation apparatus for controlling a transponder to recognize mediation algorithm information contained in a control signal, and performing a corresponding mediation algorithm to which an optimum mediation parameter is applied.

Therefore, the transponder can selectively perform a mediation algorithm having the best performance in current arrival rates of moving objects.

In accordance with still another aspect of present invention, there is provided a communication mediation method, including the steps of: a) enabling a transponder to recognize mediation algorithm information contained in a control signal; b) performing a corresponding mediation algorithm corresponding to the recognized mediation algorithm information, and determining a transmission time of a response signal; c) transmitting the response signal to a controller; and d) if an acknowledge (ACK) signal is not received from the controller within a predetermined time, re-performing the mediation algorithm to re-transmit the response signal.

Therefore, the present invention can add an operation for checking the mediation algorithm information contained in the control signal to operations of a transponder.

In accordance with still another aspect of present invention, there is provided a communication mediation method, including the steps of: a) if an ACK signal is not received from the controller within a predetermined time, creating random numbers on the basis of a mediation parameter of a mediation algorithm; and b) creating a delayed time by counting a predetermined time corresponding to the created random numbers.

Therefore, the present invention can add an operation for checking the mediation algorithm information contained in the control signal to operations of a transponder. Provided that the mediation algorithm information indicates a random delay count value mediation algorithm based on an immediate transmission scheme, the present invention can perform the operation steps of the transponder.

Preferably, the step of determining a transmission time of a response signal using a mediation algorithm associated with recognized mediation algorithm information includes the steps of: creating random numbers; and creating a delayed time by counting a predetermined time corresponding to the created random numbers.

Therefore, the present invention can add an operation for checking the mediation algorithm information contained in the control signal to operations of a transponder. Provided that the mediation algorithm information indicates a random delay count value mediation algorithm based on a delayed transmission scheme, the present invention can perform the operation steps of the transponder.

In accordance with still another aspect of present invention, there is provided a communication mediation method, including the steps of: a) controlling a transponder to wait for reception of a control signal; b) recognizing mediation algorithm type information contained in the received control signal; c) performing a mediation algorithm associated with the mediation algorithm type information, and determining a transmission time of a response signal; d) transmitting the response signal to the controller; and e) if an ACK signal i not received from the controller within a predetermined time, returning to the step (a), and re-transmitting the response signal.

Therefore, the present invention can add an operation for checking the mediation algorithm information contained in the control signal to operations of a transponder in accordance with another preferred embodiment.

The step of determining a transmission time of a response signal by performing a mediation algorithm associated with the recognized mediation algorithm includes the steps of: generating random numbers; comparing the random numbers with a mediation parameter to determine whether a response signal transmission condition is satisfied; if the response signal transmission condition is satisfied, determining the transmission time of the response signal.

Therefore, the present invention can add an operation for checking the mediation algorithm information contained in the control signal to operations of a transponder. Provided that the mediation algorithm information indicates a persistence mediation algorithm, the present invention can perform the operation steps of the transponder.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
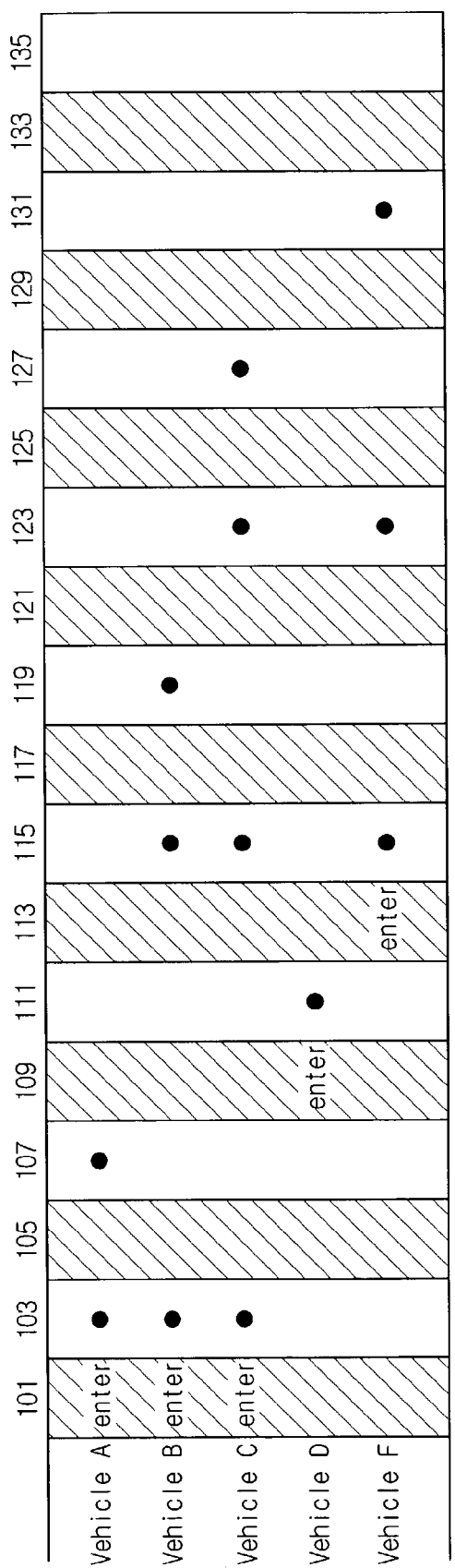
FIG. 1 is a conceptual diagram illustrating a mediation algorithm for use with such a random delay count value.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Prior to describing the present invention, it should be noted that a performance of a communication mediation method based on a random delay count value mediation algorithm and a persistence mediation algorithm varies with a difference in numbers of moving objects (i.e., traffic volume variation), individual communication mediation methods have different performances according to a difference in mediation parameters. Provided that a fixed mediation parameter is adapted to a communication mediation method, different system reliabilities may occur according to the difference in numbers of moving objects.

Therefore, provided that a mediation parameter is dynamically applied to individual communication mediation algorithms according to arrival rates of the moving objects, a system performance may be improved, such that the present invention provides a method for dynamically varying such a mediation parameter during a communication time.

It should be noted that a specified system for recognizing vehicles is adapted as an example in the present invention.

The present invention performs a computer simulation based on a software program to analyze performances of individual vehicle mediation methods depending upon traffic volume variation. In the case of performing the computer simulation, the present invention makes the following assumptions to consider only traffic volume variation as a communication environment variable, in communication between a vehicle and a roadside controller, while constantly maintaining the remaining values other than the traffic volume variation.

The first assumption is that a mediation algorithm is based on a time-sharing method.

The second assumption is that the vehicles in multiple traffic lines communicate with the roadside controller, and communicable distances for each of the multiple traffic lanes are equal to each other.

The third assumption is that a communication transfer rate used for uplink or downlink transmission is fixed to a predetermined value, and a duration time for transmission of one packet is set to a predetermined value in either uplink or downlink transmission.

The fourth assumption is that all vehicles travel at a predetermined speed.

The fifth assumption is that communication data is transmitted without any error on the condition that the communication data does not collide with data of another vehicle.

Communicable times depending upon communication environment variables agreeing with the above-identified assumptions can be calculated as follows.

A limited communication time assigned to one vehicle is equal to a duration time for which the vehicle passes through a communicable section, and is also denoted by t=d/v (where "d" is a communicable distance, and "v" is a vehicle speed), such that a duration time needed for transmission of one packet is denoted by T=l/r (where "l" is a packet length, and r is a communication transfer rate).

Therefore, the limited communication time is the same as a duration time for which t/T packets are transmitted. In the case of calculating the limited communication time using real data, provided that a communicable range is 5 ms, a packet length is 1000 bits, a communication transfer rate is 250 Kbit/s, a vehicle speed is 100 Km/h, the value of "t" is 180 ms and the value of "T" is 4 ms, such that the vehicle must finish communicating with a roadside controller within a predetermined time of 45 packets. Provided the above-identified conditions are not provided, the vehicle fails to communicate with the roadside controller within the predetermined time of 45 packets, and passes through a communicable section without communicating with the roadside controller.

On the other hand, a random number generation method is adapted to design traffic volume variation needed for the above computer simulation. In this case, it is assumed that the flow of individual vehicles is not affected by other vehicles, such that the flow of all vehicles is called the free flow of vehicles.

A time-varying arrival pattern of vehicles can be obtained on the basis of a mean arrival rate for every timeslot (i.e., a mean arrival rate for every time "T") in the following simulation program.

```
procedure makeArrivalPattern (AvlRate)
    do
        SumOfVehicles=0;
        for i=0 to MaxTSNum
            TS [i] .NumOfVehicles=0;
        Next i
        for i=0 to AvlRate*PatternBound
            if ( (TSNum=random (PatternBound) )
                <MaxTSNum) then
                TS [TSNum]].NumOfVehicles++;
                SumOfVehicles++;
            end if
        next i
    until (SumOfVehicle>=MaxTSNum*
        (AvlRate-ErrAvlRate) &&SumOfVehicle<
        MaxTSNum* (AvlRate+ErrAvlRate) )
end procedure
```

Reference characters in the above-identified computer simulation program are as follows:

1) AvlRate(vehicles/timeslot_length(sec)): the mean number of arriving vehicles for every time "T";

2) SumOfVehicle: the total number of arriving vehicles;

3) PatternBound: the total number of timeslots to be created in a computer simulation;

4) MaxTSNum: the total number of timeslots to be really adapted to a computer simulation;

5) TS [TSNum].NumOfVehicles: the number of vehicles generated in a (TSNum+1)-th timeslot; and 6) ErrAvlRate(vehicles/timeslot_length(sec)): allowable error in a mean arrival rate of vehicles.

Figure 2:
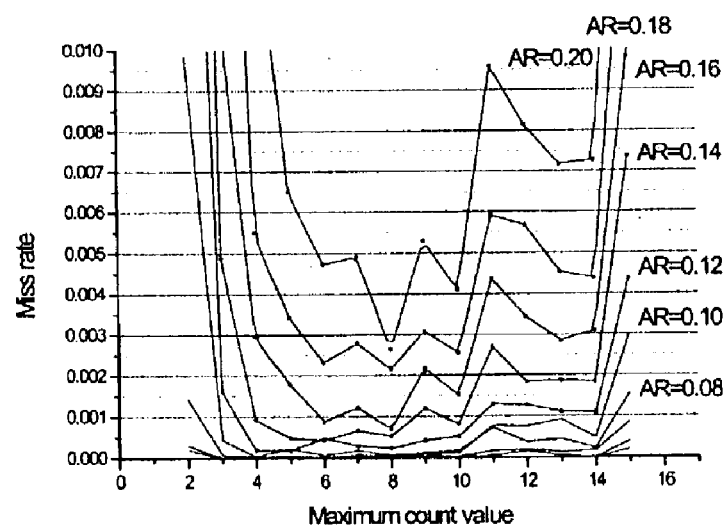
FIG. 2 is an exemplary graph illustrating a communication miss rate obtained by the simulation result in a random delay count value mediation algorithm based on a delayed transmission scheme in accordance with a preferred embodiment of the present invention.
Figure 3:
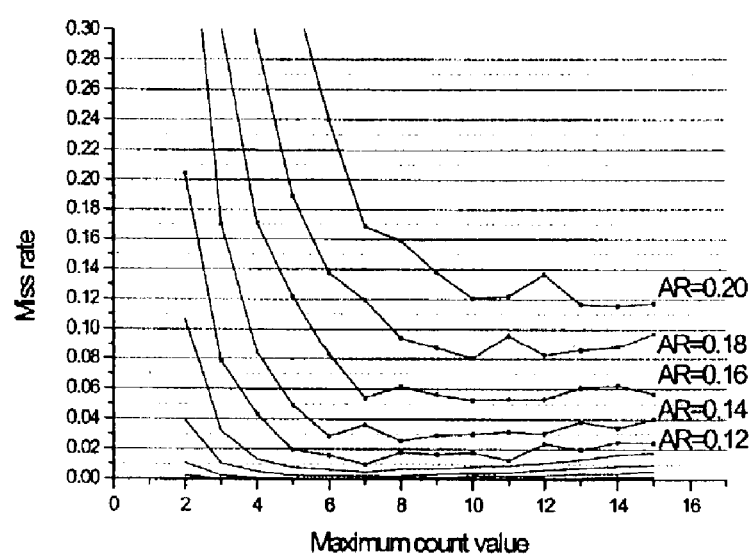
FIG. 3 is an exemplary graph illustrating a communication miss rate obtained by the simulation result in a random delay count value mediation algorithm based on an immediate transmission scheme in accordance with a preferred embodiment of the present invention.
Figure 4:
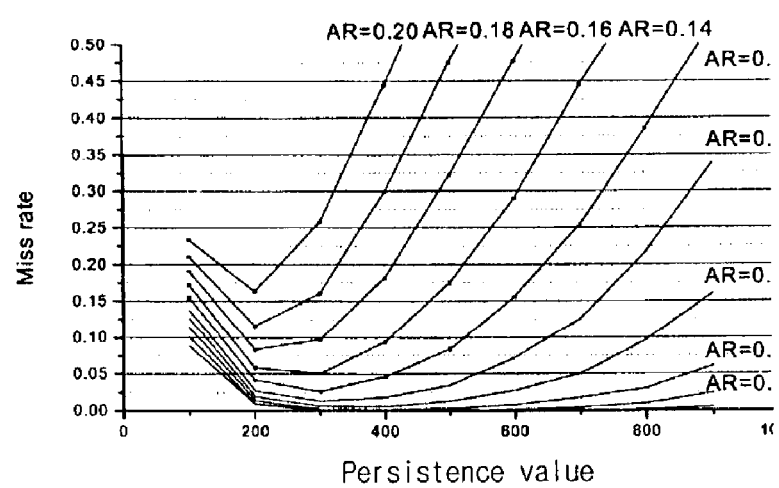
FIG. 4 is an exemplary graph illustrating a communication miss rate obtained by the simulation result in a persistence-mediation algorithm in accordance with a preferred embodiment of the present invention.

With reference to the aforementioned computer simulation program, vehicles are distributed in the MacTSNum number of packet intervals according to a mean arrival rate of the vehicles within the range of allowable error, the results of applying created arrival patterns of the vehicles to individual mediation methods are shown in FIGS. 2 to 4.

The communication parameters for use in the present invention are as follows:

1) communicable distance: 5 ms;
2) packet length: 1000 bits;
3) communication transfer rate: 250 kbit/s; and
4) vehicle speed: 100 km/h.

Therefore, a timeslot occupied by one packet is 4 ms, and a communication mode needs to be completed within 45 timeslots (e.g., 180 ms). It is assumed that the arrival rates of vehicles are in the range of from 0.004 vehicles per timeslot to 0.2 vehicles per timeslot. In other words, it is assumed that the arrival rates of vehicles are in the range of from 1 vehicle per second to 50 vehicles per second.

FIG. 2 is an exemplary graph illustrating a communication miss rate obtained by the simulation result in a random delay count value mediation algorithm based on a delayed transmission scheme in accordance with a preferred embodiment of the present invention. In this case, the communication miss rates are dependent on differences in the vehicles' arrival rates indicated by ARs of a graph or maximum count values indicated on an X-axis of a graph.

The number of needed mean timeslots for communication with others is equal to a mean value of timeslots consumed until a vehicle receiving a control signal firstly receives an ACK signal after transmitting a response signal to the controller. If the vehicle's arrival rate is a very low value "AR=0.10", the number of mean timeslots is nearly proportional to a predetermined value (i.e., a maximum count value/2). The reason why the mean timeslots are proportional to the predetermined value is that there are few timeslots additionally consumed due to data collision in communication, and thus a vehicle can immediately receive the ACK signal using the next control signal after transmitting a response signal.

The aforementioned description can be recognized by the fact that a communication miss rate is a very low value of less than 2E-4 in the range from 4 to 10 when a vehicle's arrival rate is a very low value as shown in FIG. 3. However, a time period for generating a control signal is longer than that of another method, such that at least a few timeslots are needed to perform a communication function.

With reference to a variation pattern in communication miss rates as shown in FIG. 2, it can be recognized that the communication miss rates are lowered on the condition that a maximum count value is lower than a maximum count value "8", but increased on the other condition that the communication miss rates are higher than the maximum count value "8". In this case, it should be noted that variation of patterns of such communication miss rates occurs when the maximum count value is in the range from 6 to 7, 9 to 10, or 11 to 14, because the control signals are generated using a "maximum count value+1" number of timeslots as one period on the condition that only 45 timeslots are permitted for communication. For example, if a maximum count value is in the range from 11 to 14, each ACK signal in four cases, i.e., (11+1)*3=36, (12+1)*3=39, (13+1)*3=42, and (14+1)*3=45, can be received from the controller only three times. However, the higher the maximum count value, the lower the probability of data collision in communication, resulting in reduction of a communication miss rate. The remaining ranges including such variation pattern in communication miss rates are also caused by the same conditions as in the above description. This reduction of communication miss rate becomes greater when there are fewer timeslots limited by a communicable time period. Therefore, in order to perform communication mediation using the above method, it is necessary for a maximum count value to be selected after being verified by a previous simulation.

FIG. 3 shows the simulation result in a random delay count value mediation algorithm based on an immediate transmission scheme in accordance with a preferred embodiment of the present invention. In this case, a control signal is generated for every two timeslots, such that a small number of timeslots are needed in a low arrival rate of a vehicle, resulting in rapid communication. It can be recognized that there is no variation of communication miss rates in FIG. 3 differently from FIG. 2. However, the higher the arrival rate for vehicles, the higher the initial data collision rate, such that a communication miss rate is rapidly increased with increasing the number of needed timeslots. As a result, the random delay count value mediation algorithm based on an immediate transmission scheme has a communication miss rate higher than that of the delayed transmission scheme.

FIG. 4 is an exemplary graph illustrating a communication miss rate obtained by the simulation result in a persistence-mediation algorithm in accordance with a preferred embodiment of the present invention. In FIG. 4, random numbers are created in the range from 0 to 999. In this case, it can be recognized that the number of consumed timeslots and a communication miss rate are reduced in the right and left sides of a predetermined persistence value indicating the best performance. If a vehicle's arrival rate is a very low value, a very low communication miss rate can be obtained by properly selecting a persistence value. Otherwise, if a vehicle's arrival rate is higher, the persistence mediation algorithm depicted in FIG. 4 has a communication performance inferior to those of the aforementioned two methods, in light of the number of timeslots and the communication miss rate.

Based on the aforementioned simulation results of several mediation methods of FIGS. 1 to 4 depending upon traffic volume variation, there can be obtained optimum parameters of individual mediation algorithms coping with such traffic volume variation.

With reference to the above simulation results, the optimum mediation parameters of individual vehicle-mediation methods depending on traffic volume variation are described in the following table 1.

TABLE 1

| Arrival rate for vehicle | Random delay count value (delayed transmission)— maximum count value | Random delay count value (immediate transmission)— maximum count value | Persistence scheme— Persistence value/100 |
| --- | --- | --- | --- |
| 0.004 | 2 (0) | 2 (0) | 5 (0) |
| 0.008 | 2 (0) | 2 (0) | 5 (0) |
| 0.012 | 2 (0) | 2 (0) | 5 (0) |
| 0.016 | 2 (0) | 2 (0) | 5 (0) |
| 0.02 | 3 (0) | 3 (0) | 5 (0) |
| 0.04 | 3 (0) | 4 (1.00E−4) | 5 (4.94E−4) |
| 0.06 | 3 (0) | 5 (4.34E−4) | 4 (1.65E−3) |
| 0.08 | 4 (0) | 7 (2.10E−3) | 4 (5.37E−3) |
| 0.10 | 4 (4.00E−5) | 7 (4.85E−3) | 3 (1.32E−2) |
| 0.12 | 5 (1.83E−4) | 7 (1.02E−2) | 3 (2.63E−2) |
| 0.14 | 6 (4.29E−4) | 8 (2.59E−2) | 3 (5.08E−2) |
| 0.16 | 8 (6.99E−4) | 10 (5.26E−2) | 2 (8.34E−2) |
| 0.18 | 8 (2.15E−3) | 10 (8.06E−2) | 2 (1.16E−1) |
| 0.20 | 8 (2.64E−3) | 14 (1.16E−1) | 2 (1.63E−1) |

Numerals in "( )" indicate individual communication miss rates at corresponding parameters With reference to the above table 1, the random delay count value mediation algorithm adapts a maximum count value as a mediation parameter for acquiring an optimum performance depending on an arrival rate for vehicles, and the persistence mediation algorithm adapts a persistence value as the mediation parameter.

Referring to the simulation program result shown in the table 1, it is noted that a mediation algorithm corresponding to the random delay count value algorithm based on a delayed transmission scheme has the highest communication success rate in all the arrival rates for vehicles. However, a prescribed distance between two vehicles sequentially entering a communication area in a single traffic lane should be ensured in light of real road traffic conditions, such that it is impossible for the vehicle's arrival rate in only one traffic lane to be increased over a predetermined threshold value. For example, although two vehicles being spaced from each other by a predetermined interval of 10 m enter a communication area at a vehicle speed of 100 km/h, they are spaced from each other by a prescribed time of 90 timeslots, and thus is impossible to indicate a vehicle's arrival rate of more than "0.0111 vehicle/timeslot". Therefore, although one controller controls five traffic lanes, a predetermined value "0.056 vehicle/timeslot" is equal to a maximum arrival rate for vehicles.

It is assumed that the aforementioned simulation result data of the present invention adapts 45 timeslots as a limited communication time, such that a communication miss rate can be reduced to be less than a predetermined value "1E-4" in all the communication mediation methods when the limited communication time is longer than the prescribed time of 45 timeslots.

Therefore, as shown in the simulation result of the present invention, provided that a vehicle's arrival rate is a very low value and there is spare time in the limited communication time, it is preferable for a user or operator to select an easy algorithm having a simple hardware structure. Provided that the limited communication time is a very short time, it is noted that the random delay count value algorithm based on the delayed transmission scheme has the highest communication success rate, as seen from the results of simulation program.

In this way, it is possible for a vehicle mediation simulation to be performed with variably applying optimum parameters shown in the table 1 to vehicles according to individual arrival rates for the vehicles. With reference to the above simulation results, performance difference between a first simulation for adapting a dynamic mediation parameter and a second simulation for adapting a fixed mediation parameter can be recognized by a user.

The method for variably selecting an optimum parameter according to vehicles' arrival rates greatly increases a communication success rate, compared with a conventional method for adapting a fixed parameter, as shown in the following tables 2 to 4. The tables 2, 3 and 4 indicate improved degrees of communication success rates on the basis of vehicles' arrival rates, as compared to the second simulation method using the fixed parameter.

For example, the random delay count value mediation algorithm shown in the following tables 2 and 3 adapts a maximum count value "7" as a fixed mediation parameter, and the persistence-mediation algorithm shown in the following table 4 adapts a persistence value "400" as such a fixed mediation parameter. The maximum count value "7" and the persistence value "400" shown in the tables 2 to 4 are adapted to indicate mostly superior communication success rates associated with traffic volume variation. Therefore, the maximum count value "7" and the persistence value "400" are considered as optimum mediation parameters in a static mediation method, respectively.

TABLE 2

| Arrival rate for vehicle | Communication miss rate (the number denoted in "( )" = maximum count value) | | Degree of improvement |
|---|---|---|---|
| | Static method | Dynamic method | |
| 0.02 | 0 (7) | 0 (3) | — |
| 0.04 | 0 (7) | 0 (3) | — |
| 0.06 | 3.30E-5 (7) | 0 (3) | 00 |
| 0.08 | 7.50E-5 (7) | 0 (4) | 00 |
| 0.10 | 1.80E-4 (7) | 4.00E-5 (4) | 78% |
| 0.12 | 3.00E-4 (7) | 1.83E-4 (5) | 39% |
| 0.14 | 6.57E-4 (7) | 4.29E-4 (6) | 35% |
| 0.16 | 1.21E-3 (7) | 6.99E-4 (8) | 42% |
| 0.18 | 2.79E-3 (7) | 2.15E-3 (8) | 23% |
| 0.20 | 4.90E-3 (7) | 2.64E-3 (8) | 46% |

With reference to the above table 2, provided that the random delay count value mediation algorithm based on a delayed 5 communication scheme is adapted to the present invention and the conventional art, a communication mediation method for adapting a variable mediation parameter to the present invention is compared with a conventional communication mediation method in light of their communication reliability.

TABLE 3

| Arrival rate for vehicle | Communication miss rate (the number denoted in "( )" = maximum count value) | | Degree of improvement |
|---|---|---|---|
| | Static method | Dynamic method | |
| 0.02 | 0 (7) | 0 (3) | — |
| 0.04 | 1.00E-4 (7) | 1.00E-4 (4) | 0% |
| 0.06 | 5.66E-4 (7) | 4.34E-4 (5) | 23% |
| 0.08 | 2.10E-3 (7) | 2.10E-3 (7) | 0% |
| 0.10 | 4.85E-3 (7) | 4.85E-3 (7) | 0% |
| 0.12 | 1.02E-2 (7) | 1.02E-2 (7) | 0% |
| 0.14 | 3.63E-2 (7) | 2.59E-2 (8) | 39% |
| 0.16 | 5.41E-2 (7) | 5.26E-2 (10) | 28% |
| 0.18 | 1.19E-1 (7) | 8.06E-2 (10) | 32% |
| 0.20 | 1.68E-1 (7) | 1.16E-1 (14) | 31% |

With reference to the above table 3, provided that the random delay count value mediation algorithm based on an immediate transmission scheme is adapted to the present invention and the conventional art, a communication mediation method for adapting a variable mediation parameter to the present invention is compared with a conventional communication mediation method in light of their communication reliability.

TABLE 4

| Arrival rate for vehicle | Communication miss rate (the number denoted in "( )" = persistence value) | | Degree of improvement |
|---|---|---|---|
| | Static method | Dynamic method | |
| 0.02 | 9.80E-5 (400) | 0 (500) | 00 |
| 0.04 | 5.43E-4 (400) | 4.94E-E (500) | 9.0% |
| 0.06 | 1.65E-3 (400) | 1.65E-3 (400) | 0% |
| 0.08 | 5.37E-3 (400) | 5.37E-3 (400) | 0% |
| 0.10 | 1.84E-2 (400) | 1.32E-2 (300) | 28% |
| 0.12 | 4.63E-2 (400) | 2.63E-2 (300) | 43% |
| 0.14 | 9.37E-2 (400) | 5.08E-2 (300) | 46% |
| 0.16 | 1.82E-1 (400) | 8.34E-2 (200) | 54% |
| 0.18 | 2.99E-1 (400) | 1.16E-1 (200) | 61% |
| 0.20 | 4.44E-1 (400) | 1.63E-1 (200) | 63% |

With reference to the above table 4, provided that the persistence mediation algorithm is adapted to the present invention and the conventional art, a communication mediation method for adapting a variable mediation parameter to the present invention is compared with a conventional communication mediation method in light of their communication reliability.

Referring to the simulation result data shown in the above tables 2, 3 and 4, it can be recognized that a method for variably selecting an optimum parameter in response to a vehicle's arrival rate has a much higher communication success rate than the static mediation algorithm for use with a fixed mediation parameter. However, provided that a vehicle's arrival rate is beyond 0.08 in the above table 3, and a vehicle's arrival rate is beyond 0.06 in the above table 4, a communication miss rate is higher than a specified value "1E-3" in the range of communication environment variables for use in simulation, resulting in less utility in actual use. Therefore, it is preferable for the random delay count value mediation algorithm based on the delayed transmission scheme to be used in the above case causing the communication miss rate of higher than the specified value "1E-3".

In the case where there is spare time in a communicable time, the aforementioned algorithms can be applied to the random delay count value mediation algorithm based on the immediate transmission scheme or the mediation algorithm based on a persistence mediation algorithm. As seen from the tables 2, 3 and 4, if the above algorithm is applied to the above three mediation methods, a communication success rate is improved within a prescribed time "0.1/timeslot" being a high arrival rate for vehicles, i.e., more than 25 vehicles per second. In this case, there is provided the prescribed time "0.1/timeslot" during which a mediation function must be performed.

The following table 5 indicates a mean improvement degree expected at a specified traffic volume associated with a predetermined communication success rate of the inventive algorithm on the condition that a vehicle's arrival rate is in the range from 0.1/timeslot to 0.2/timeslot.

TABLE 5

| Method for mediating objects to which algorithm is applied | Mean improvement degree |
| --- | --- |
| Random delay count value algorithm based on delayed transmission scheme | 44% |
| Random delay count value algorithm based on immediate transmission scheme | 22% |
| Persistence algorithm | 49% |

The above-identified descriptions can be simplified as follows. Namely, the present invention adapts the random delay count value mediation algorithm and a persistence mediation algorithm as a communication mediation algorithm while reducing a communication miss rate caused by collision of data in a system (e.g., an automatic charging system, a system for managing domestic animals, and a system for managing stored goods, etc.) for recognizing a plurality of moving objects by allowing one controller to communicate with a transponder contained in each moving object. But, such conventional communication mediation algorithms have different communication reliabilities, i.e., different communication miss rates, according to a difference in numbers of many moving objects.

This difference in communication reliabilities occurs due to a mediation parameter for use in each communication mediation algorithm, such that an optimum mediation parameter corresponding to the difference in numbers of moving objects (e.g., traffic volume variation or variation of domestic animals) of moving objects to be recognized by a controller is variably applied to the communication mediation algorithm in the present invention.

For this purpose, the controller recognizes a current arrival rate for moving objects (e.g., vehicles) on the basis of the number of the moving objects arriving within a predetermined period of time. A mediation parameter for indicating an optimum performance in the recognized arrival rates is contained in a control signal, and is then transmitted to the moving objects (e.g., vehicles). Upon receiving the control signal from the controller, the moving objects being vehicles transmit response signals using a mediation parameter contained in the control signal.

It should be noted that the above simulation results are exemplarily shown for the convenience of description and better understanding of the present invention. Provided that the present invention is actually implemented, different simulation results may be obtained according to the type and characteristics of target objects (e.g., a warehouse having articles in stock, and an automatic charging system for a specified road, etc.) because the target objects are different in their communicable ranges, packet lengths, communication transfer rates, wireless communication environments, and moving speeds.

It is expected that a mediation algorithm having the best performance is found in arrival rates of individual moving objects according to the application type of the present invention. For example, referring back to the table 1 showing optimum mediation parameters for use in individual mediation methods for vehicles agreeing with traffic volume variation, the persistence mediation algorithm has an optimum mediation parameter (i.e., a persistence value) "3" (i.e., a communication miss rate "1.32E-2") at a prescribed vehicle's arrival rate "0.10". The mediation algorithm having the best performance at a vehicle's arrival rate "0.10" is the random delay count value algorithm based on a delayed transmission scheme. In this case, an optimum mediation parameter being a maximum count value is "4" (i.e., a communication miss rate "4.00E-5")

In conclusion, a plurality of mediation algorithms are used instead of a single mediation algorithm in accordance with the above preferred embodiment of the present invention. In more detail, the controller selects an optimum mediation parameter having the best performance in current arrival rates for vehicles, and also selects an appropriate mediation algorithm agreeing with the selected optimum mediation algorithm. The controller enables a control signal to include the selected optimum mediation parameter and the selected mediation algorithm information, and transmits the control signal to a transponder. Therefore, the transponder performs a corresponding mediation algorithm according to the mediation algorithm information. In this case, the optimum mediation parameter is adapted to execute a corresponding mediation algorithm.

Figure 5:
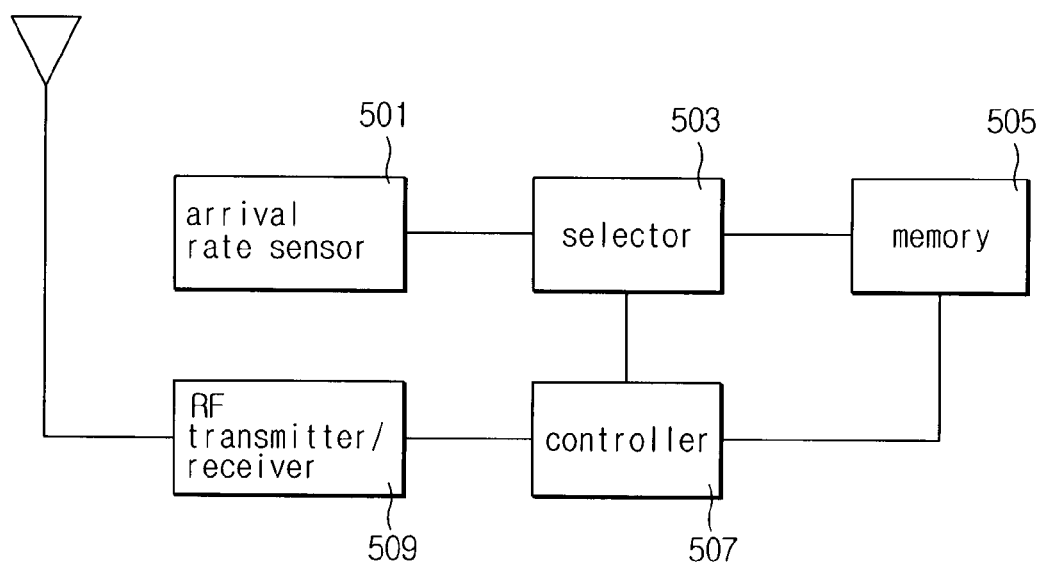
FIG. 5 is a block diagram of a controller in accordance with the present invention.

FIG. 5 is a block diagram of the controller in a system for recognizing moving objects by communicating with a transponder contained in each of the moving objects in accordance with the present invention.

Referring to FIG. 5, the controller includes: an arrival rate sensor 501 for recognizing current arrival rates of moving objects (i.e., vehicles) by counting the number of moving objects arriving within a prescribed time; a memory 505 for storing an optimum mediation parameter having the best performance for every arrival rate and mediation algorithm information associated with the optimum mediation parameter; a selector 503 for selecting the optimum mediation parameter agreeing with the current arrival rate and the mediation algorithm information associated with the optimum mediation parameter stored in the memory 505; and a controller 507 for adding the optimum mediation parameter corresponding to the selected current arrival rate and mediation algorithm information associated with the optimum mediation parameter to a control signal, transmitting the control signal within a communicable range, and transmitting an ACK signal within the communicable range upon receiving a response signal from a corresponding transponder (not shown).

A radio frequency (RF) transmitter/receiver 509 is adapted to process RF signals communicating between the controller and a transponder, and may perform the same function as the conventional controller.

In more detail, the RF transmitter/receiver 509 modulates the control signal and the ACK signal received from the controller 507 according to various signal propagation methods, for example, sound waves such as ultrasonic waves, interference light, infrared rays (IR), and radio frequency (RF), and wirelessly outputs the modulation result through an antenna. The RF transmitter/receiver 509 demodulates a signal (i.e., a response signal) received through the antenna, and transmits the demodulation result to the controller 507.

Particularly, the RF transmitter/receiver 509 transmits RF signals defined by the strength of electromagnetic field adapted to define a recognizable range of each transponder. Therefore, each transponder replies to the electromagnetic field radiated from the controller in such a way that a power-supply voltage can be created.

The memory 505 stores an optimum mediation parameter having the best performance for every arrival rate, and mediation algorithm information associated with the optimum mediation parameter. Provided that the optimum mediation parameter and associated mediation algorithm information are previously simulated by a computer program at a prescribed place considered as an applicable target of the present invention, more accurate optimum mediation parameter and its associated mediation algorithm information are obtained. In this case, the random delay count value mediation algorithm or persistence mediation algorithm may be adapted as such mediation algorithm.

The arrival rate sensor 501 recognizes current arrival rates of moving objects by counting the number of moving objects arriving within a prescribed time. In more detail, the arrival rate sensor 501 may receive an arrival detection signal from a sensor detecting the moving objects when the moving object passes through an inspection gate (not shown in FIG. 5).

The selector 503 selects an optimum mediation parameter having the best performance in current arrival rates received from the arrival rate sensor 501 and corresponding mediation algorithm information associated with the optimum mediation parameter from among all data stored in the memory 505.

The controller 507 adds the optimum mediation parameter corresponding to the selected current arrival rate and mediation algorithm information associated with the optimum mediation parameter to a control signal, and transmits the control signal within a communicable range. In this case, the controller 507 may generate a control signal having a frame structure as shown in FIG. 8.

Figure 8:
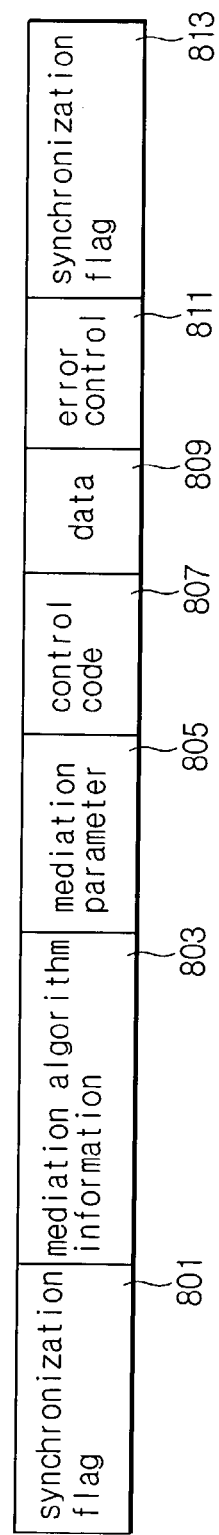
FIG. 8 is a view illustrating a frame structure of a control signal in accordance with the present invention.

FIG. 8 is a view illustrating a frame structure of the control signal in accordance with the present invention.

Referring to FIG. 8, an optimum mediation parameter selected by the selector 503 is contained in a field 805. There may be no need for a field 803 indicating mediation algorithm information to be used when high reliability is obtained by changing only the value of a parameter to another value using only one communication mediation algorithm (e.g., random delay count value mediation algorithm or persistence mediation algorithm). However, provided that there is a need for the mediation algorithm to be changed, corresponding mediation algorithm information to which an optimum mediation parameter can be applied should be transmitted to transponders.

A control code field 807 shown in the frame structure of FIG. 8 corresponds to a command transmitted to the transponders via the controller. The data field 809 corresponds to general transmission data. These control code field 807 and the data field 809, synchronization flag fields 801 and 813 for frame synchronization, and an error control field 811 are generally used in a control signal.

In the case where a signal received from the RF transmitter/receiver 509 indicates a transponder's response having no error, the controller 507 generates an ACK signal, and transmits the ACK signal to the transponder through the RF transmitter/receiver 509.

Figure 6:
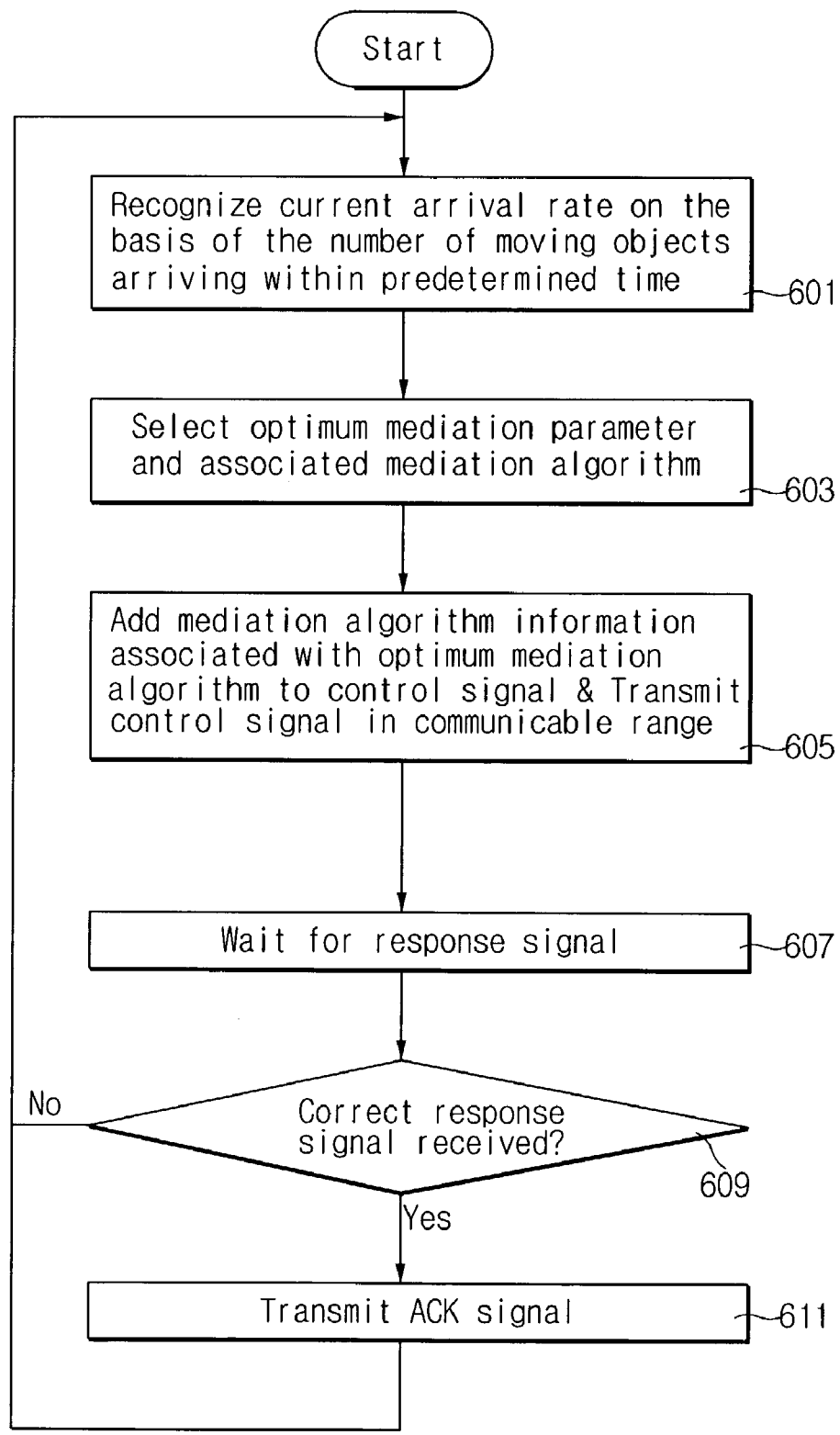
FIG. 6 is a flow chart illustrating operations of the controller shown in FIG. 5 in accordance with the present invention.

FIG. 6 is a flow chart illustrating operations of the controller shown in FIG. 5 in accordance with the present invention.

Referring to FIGS. 5 and 6, the arrival rate sensor 501 recognizes arrival rates of current moving objects on the basis of the number of moving objects arriving within a prescribed time at step 601. Also, the arrival rates of the moving objects can be recognized by counting the number of moving objects entering a communicable range within a prescribed time.

The selector 503 selects an optimum mediation parameter having the best performance in current arrival rates received from the arrival rate sensor 501 and corresponding mediation algorithm information associated with the optimum mediation parameter from among all data stored in the memory 505 at step 603.

In this case, the memory 505 contained in the controller may store optimum mediation parameters corresponding to individual arrival rates while being classified according to communication mediation algorithms. Herein, the mediation parameter may be either a maximum delay count value for use in the random delay count value mediation algorithm, or a persistence value for use in a persistence mediation algorithm.

The controller 507 enables a control signal to include the optimum mediation parameter selected at step 603 and mediation algorithm information associated with the optimum mediation parameter, and transmits the control signal in a communication range at step 605.

After performing the step 605, the controller 507 waits for a response signal from a transponder for a prescribed time at step 607. The controller 507 determines whether a correct response signal is received at step 609. If the response signal is not received or a plurality of transponders simultaneously transmit their response signals due to collision of data, it is impossible for the controller to receive a correct response signal.

After performing the step 607, the controller 507 returns to the step 601. If the controller 507 receives such an accurate response signal at step 609, it is determined that the controller 507 successfully communicates with any one of transponders arranged in a current communicable range, the controller 507 transmits the ACK signal at step 611, such that the answered transponder does not answer the next control signal.

In this case, an uplink timeslot may transmit a response signal of the transponder, and a downlink timeslot may transmit the control signal and the ACK signal. Also, it is possible for the ACK signal transmission step 611 to be deleted, and information contained in the ACK signal may also be contained in the control signal as shown in step 605, if necessary.

The response signal received from the transponder may include identification (ID) information of each transponder. Likewise, the controller 507 may add the transponder's ID information contained in the response signal to the ACK signal when transmitting the ACK signal. Because the ACK signal contains transponder's ID information, the controller 507 can transmit the ACK signal to more than two transponders at the same time.

Figure 7:
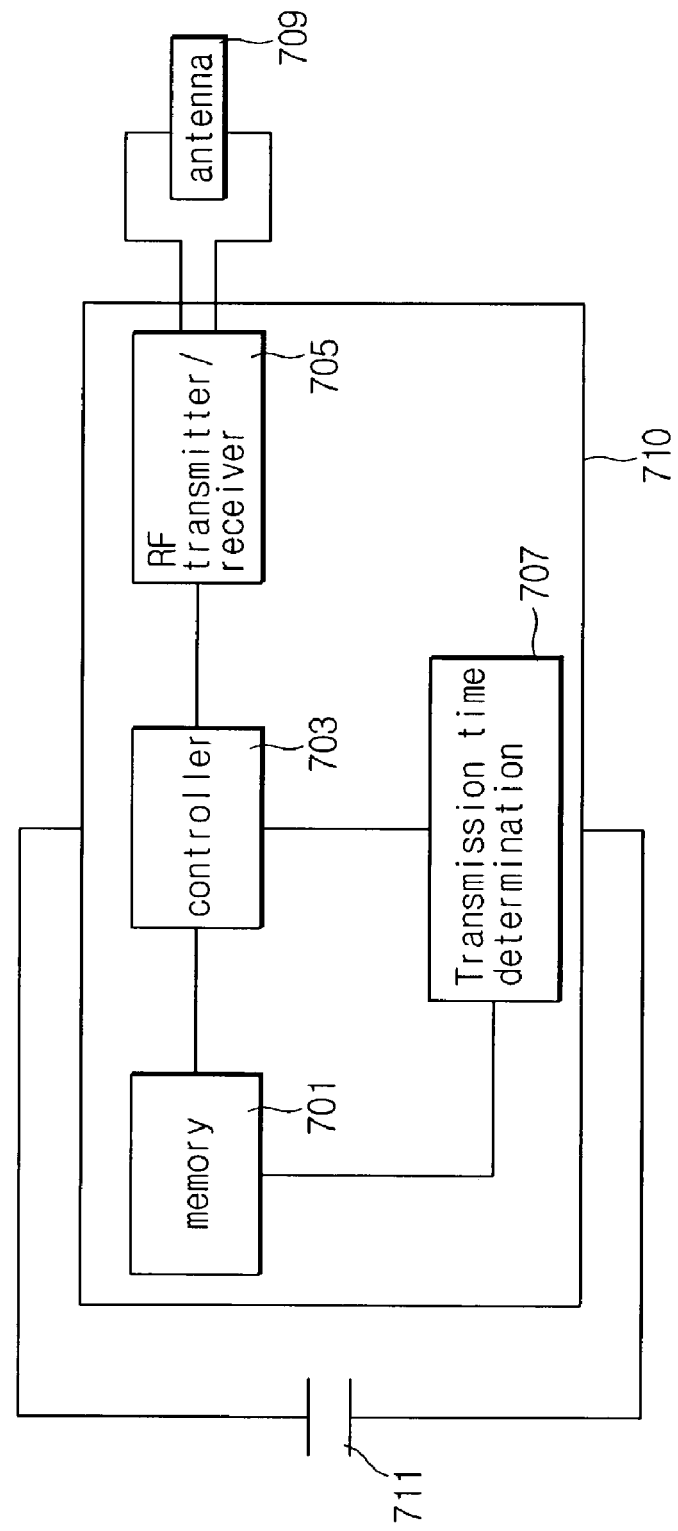
FIG. 7 is a block diagram of a transponder in accordance with the present invention.

As seen from FIGS. 6 and 7, the controller 507 recognizes current arrival rates of moving objects, allows a control signal to include an optimum mediation parameter associated with the current arrival rates and corresponding mediation algorithm information associated with the optimum mediation parameter, and then transmits the control signal. Therefore, the optimum mediation parameter and mediation algorithm information associated with the optimum mediation parameter are dynamically transmitted to the transponders according to variation of the arrival rates of the moving objects, thus reducing a communication miss rate regardless of the difference (i.e., traffic volume variation) in number of the moving objects. Also, the transponder can effectively select a mediation algorithm to which an optimum mediation parameter having the best performance in the current arrival rates of the moving objects is applied.

FIG. 7 is a block diagram of a transponder in a system for controlling a controller 507 to communicate with the transponder contained in each moving object in order to recognize the moving objects in accordance with the present invention.

Referring to FIG. 7, the transponder includes a controller 703 and a transmission time determination unit 707. Upon receiving a control signal from the controller 507, the controller 703 detects mediation algorithm information and a mediation parameter that are contained in the control signal. Upon receiving the transmission timing determination signal from the transmission time determination unit 707, the controller 703 transmits a response signal to the controller 507, and determines whether the ACK signal is received from the controller 507. The transmission time determination unit 707 performs a mediation algorithm corresponding to the detected mediation algorithm information, determines a transmission time of the response signal according to the mediation parameter and the result of indicating reception of the ACK signal within a predetermined period of time, and transmits the transmission time determination signal according to the determination result.

The RF transmitter/receiver 705 is adapted to process RF signals communicating between the controller and the transponder, and may perform the same function as the conventional controller. The RF transmitter/receiver 705 modulates a signal (i.e., a response signal) received from the controller 704, and wirelessly outputs the response signal through an antenna. The RF transmitter/receiver 705 demodulates signals (i.e., control signal and ACK signal) received through the antenna, and transmits the demodulated signals to the controller 703.

FIG. 7 is a block diagram of a passive RF transponder in accordance with the present invention. An antenna 709 receives energy from RF signals received from the controller. The energy is partially consumed to charge a capacitor 711 functioning as a power-supply unit for transponders.

Upon receiving a control signal from the RF transmitter/receiver 705, the controller 703 interprets the control signal, and recognizes mediation algorithm information and a mediation parameter value that are contained in the control signal. The controller 703 provides the transmission time determination unit 707 with the recognized information.

Upon receiving the transmission time determination signal from the transmission time determination unit 707, the controller 703 creates a response signal, and wirelessly outputs the created response signal to the controller 507. If the controller 703 receives the ACK signal from the controller 507 after transmitting the response signal to the controller 507, it transmits the ACK signal to the transmission time determination unit 707.

The transmission time determination unit 707 receives a mediation parameter, mediation algorithm information associated with the mediation parameter, and a signal indicating reception of the ACK signal from the controller 703. The transmission time determination unit 707 performs a mediation algorithm associated with detected mediation algorithm information upon receiving a control signal from the controller 703. The transmission time determination unit 707 determines a transmission time of the response signal according to the mediation parameter and the ACK signal received within a predetermined time, and generates the transmission time determination signal.

The transmission time determination unit 707 may include a random number generator, a counter, and a comparator (not shown) to perform a variety of mediation algorithms. The transmission time determination unit 707 is characterized in that it performs a plurality of mediation algorithms whereas a conventional transmission time determination unit well-known to those skilled in the art performs only one mediation algorithm.

The memory 707 may store a plurality of mediation algorithm execution data, transponders' ID data, and program data for controlling the transponders.

In the meantime, according to the present invention, the transponder recognizes mediation algorithm information contained in a control signal, and performs a mediation algorithm associated with an optimum mediation parameter. For this purpose, an operation for checking the mediation algorithm information contained in the control signal should be added to overall operations of a transponder.

There are a variety of mediation algorithms. Such a mediation algorithm retransmits a response signal when a transponder does not receive ACK signals within a predetermined time after transmitting the response signal. In this case, the mediation algorithm is classified into a first mediation algorithm and a second mediation algorithm. The first mediation algorithm employs mediation control information (i.e., a mediation parameter and mediation algorithm information) of a current reception control signal on the condition that a transponder does not receive an ACK signal within a predetermined time. The second mediation algorithm waits for the next control signal and employs mediation control information of the next control signal on the same condition as in the first algorithm. The overall operation of the transponder for checking mediation algorithm information contained in the control signal will hereinafter be described with reference to the first and second mediation algorithms.

Figure 9:
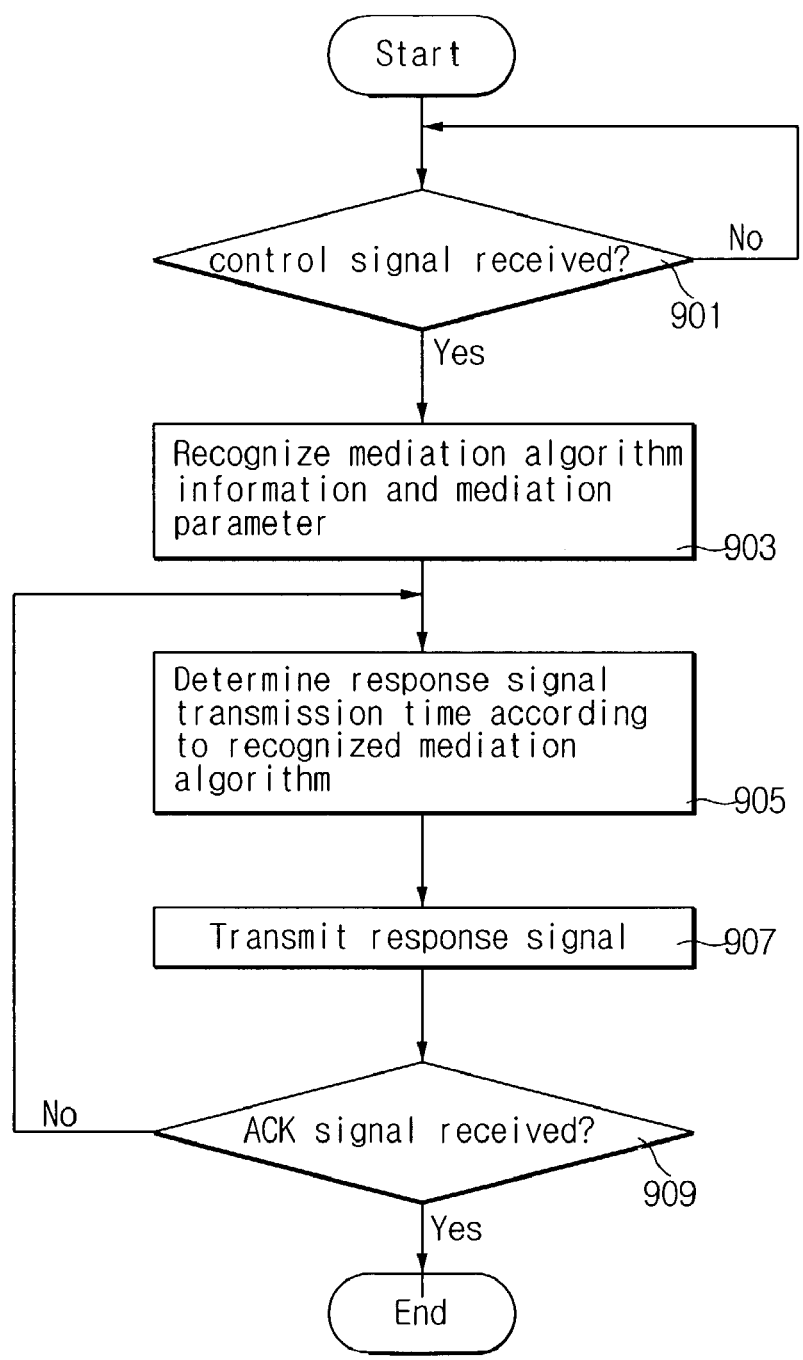
FIG. 9 is a flow chart illustrating operation steps of a transponder in accordance with the present invention.

FIG. 9 is a flow chart illustrating operation steps of a transponder in accordance with the present invention.

In FIG. 9, a mediation algorithm is performed using mediation control information (i.e., a mediation parameter, and mediation algorithm information) of a current reception control signal when no ACK signal is received from the controller 507. The random delay count value mediation algorithm is preferably adapted as such a mediation algorithm of FIG. 9.

The mediation algorithm will hereinafter be described in detail with reference to FIGS. 7 and 9.

The controller 703 determines whether a control signal is received from the RF transmitter/receiver 705 at step 901. In the case where a moving object enters a communicable range, and a control signal is received from the controller 507, the controller 703 of a transponder performs frame synchronization using frame synchronization information (shown in FIG. 8) contained in the control signal, and interprets the control signal. In this case, the controller 703 recognizes mediation algorithm information and a mediation parameter that are contained in the control signal at step 903. The controller 703 provides the transmission time determination unit 707 with the recognized mediation parameter and mediation algorithm information.

The transmission time determination unit 707 performs a mediation algorithm corresponding to the recognized mediation algorithm information upon receiving a control signal from the controller 703, and determines a transmission time of a response signal at step 905. In this case, the mediation algorithm may be a random delay count value mediation algorithm. The transmission time determination signal generated from the transmission time determination unit 707 is transmitted to the controller 703.

Upon receiving the transmission time determination signal from the transmission time determination unit 707, the controller 703 generates a response signal, and wirelessly outputs the response signal to the controller 507 through the RF transmitter/receiver 705 at step 907. The response signal may be transmitted for an uplink timeslot period. The response signal may include ID information of transponders. If the ACK signal generated from the controller 507 is received over the RF transmitter/receiver 705, the controller 703 provides the transmission time determination unit 707 with the ACK signal.

If the ACK signal is not received from the controller 507 within a prescribed time at step 909, the transmission time determination unit 707 returns to step 905 to retransmit a response signal. It is noted that the ACK signal does not additionally exist and ACK signal information may be contained in the next control signal of the controller 507 after the transmission time determination unit 707 transmits the response signal.

In the meantime, if the transmission time determination unit 707 receives the ACK signal from the controller 507 within a prescribed time at step 909, the transmission time determination unit 707 informs the controller 703 of the ACK signal, such that the controller 703 is inactivated by the next control signal.

Figure 10:
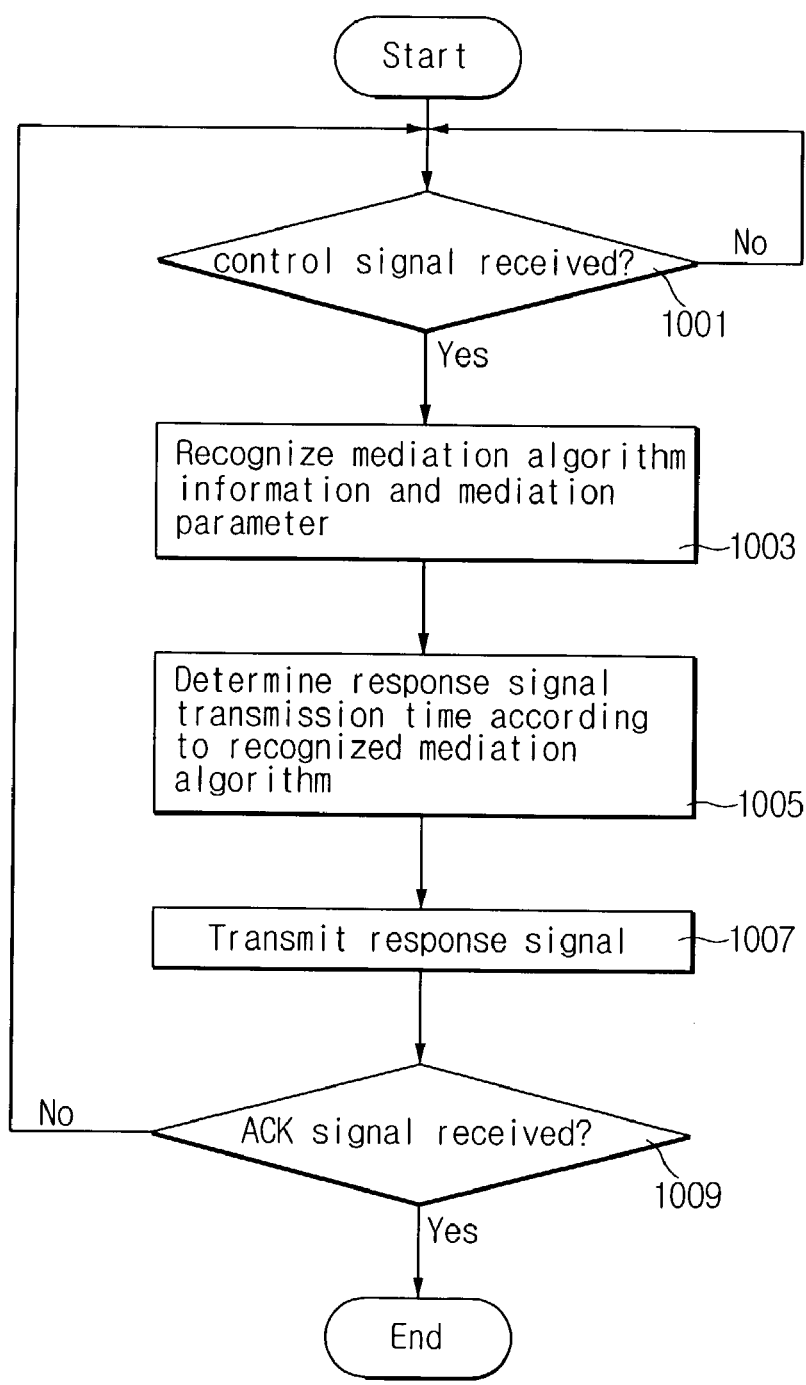
FIG. 10 is a flow chart illustrating operation steps of a transponder in accordance with the present invention.

FIG. 10 is a flow chart illustrating operation steps of a transponder in accordance with another preferred embodiment of the present invention.

In FIG. 10, a mediation algorithm waits for the next control signal when no ACK signal is received from the controller 507, and is performed using mediation control information of the next control signal. The persistence mediation algorithm is preferably adapted as such a mediation algorithm of FIG. 10.

The mediation algorithm will hereinafter be described in detail with reference to FIGS. 7 and 10.

The controller 703 determines whether a control signal is received from the RF transmitter/receiver 705 at step 1001. In the case where a moving object enters a communicable range, and a control signal is received from the controller 507, the controller 703 of a transponder performs frame synchronization using frame synchronization information (shown in FIG. 8) contained in the control signal, and interprets the control signal. In this case, the controller 703 recognizes mediation algorithm information and a mediation parameter that are contained in the control signal at step 1003. The controller 703 provides the transmission time determination unit 707 with the recognized mediation parameter and mediation algorithm information.

The transmission time determination unit 707 performs a mediation algorithm corresponding to the recognized mediation algorithm information upon receiving a control signal from the controller 703, and determines a transmission time of a response signal at step 1005. In this case, the mediation algorithm may be a random delay count value mediation algorithm. The transmission time determination signal generated from the transmission time determination unit 707 is transmitted to the controller 703.

Upon receiving the transmission time determination signal from the transmission time determination unit 707, the controller 703 generates a response signal, and wirelessly outputs the response signal to the controller 507 through the RF transmitter/receiver 705 at step 1007. The response signal may be transmitted for an uplink timeslot period. The response signal may include ID information of transponders. If the ACK signal generated from the controller 507 is received over the RF transmitter/receiver 705, the controller 703 provides the transmission time determination unit 707 with the ACK signal.

If the ACK signal is not received from the controller 507 within a prescribed time at step 1009, the transmission time determination unit 707 informs the controller 703 of no reception of an ACK signal, such that the controller 703 returns to step 1001 to retransmit a response signal.

On the other hand, if the transmission time determination unit 707 receives the ACK signal from the controller 507 within a prescribed time at step 1009, the transmission time determination unit 707 informs the controller 703 of reception of the ACK signal, such that the controller 703 is inactivated by the next control signal.

Figure 11:
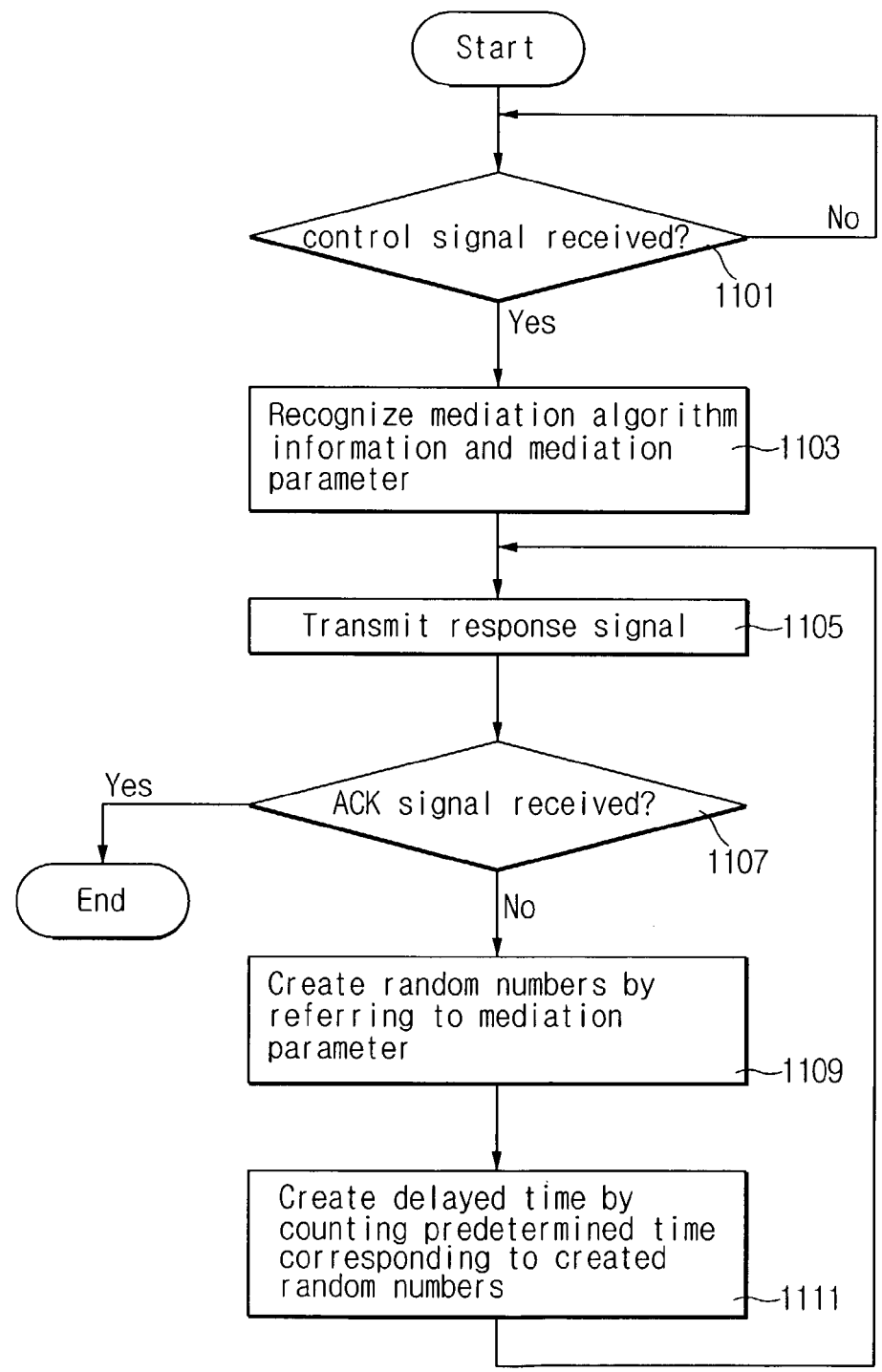
FIG. 11 is a flow chart illustrating operation steps of a transponder for use with a random delay count value mediation algorithm based on an immediate transmission scheme in accordance with the present invention.

FIG. 11 is a flow chart illustrating operation steps of a transponder for use with a random delay count value mediation algorithm based on an immediate transmission scheme in accordance with the present invention. The random delay count value mediation algorithm will hereinafter be described in detail with reference to FIGS. 9 and 11.

The controller 703 determines whether a control signal is received from the RF transmitter/receiver 705 at step 1101. In the case where a moving object enters a communicable range, and a control signal is received from the controller 507, the controller 703 performs frame synchronization using frame synchronization information (shown in FIG. 8) contained in the control signal, and interprets the control signal. In this case, the controller 703 recognizes mediation algorithm information and a mediation parameter that are contained in the control signal at step 1103. The controller 703 provides the transmission time determination unit 707 with the recognized mediation parameter and mediation algorithm information.

If the mediation algorithm information indicates a random delay count value mediation algorithm based on an immediate transmission scheme, the transmission time determination unit 707 immediately generates a transmission time determination signal. Therefore, the controller 703 receives the transmission time determination signal from the transmission time determination unit 707, creates a response signal, and wirelessly transmits the response signal to the controller 507 through the RF transmitter/receiver 705 at step 1105. The step 1105 is equal to the step 905 shown in FIG. 9.

The response signal may be transmitted for an uplink timeslot period. The response signal may include ID information of transponders. If the ACK signal generated from the controller 507 is received over the RF transmitter/receiver 705, the controller 703 provides the transmission time determination unit 707 with the ACK signal.

If the ACK signal is not received from the controller 507 within a prescribed time at step 1107, the transmission time determination unit 707 generates random numbers at step 1109 on the basis of a mediation parameter (i.e., a maximum count value) having been received from the controller 703 at step 1103. The transmission time determination unit 707 counts the created random number to create a delayed time at step 1111, and generates a transmission time determination signal.

Therefore, the controller 703 receives the transmission time determination signal from the transmission time determination unit 707, creates a response signal, and wirelessly outputs the response signal to the controller 507 through the RF transmitter/receiver 705 at step 1105. The steps 1109 and 1111 correspond to the step 905 (shown in FIG. 9) re-executed when no ACK signal is received within the prescribed time.

It is noted that the ACK signal does not additionally exist and ACK signal information may be contained in the next control signal of the controller 507 after the transmission time determination unit 707 transmits the response signal.

In the meantime, if the transmission time determination unit 707 receives the ACK signal from the controller 507 within a prescribed time at step 1107, the transmission time determination unit 707 informs the controller 703 of the ACK signal, such that the controller 703 is inactivated by the next control signal.

Figure 12:
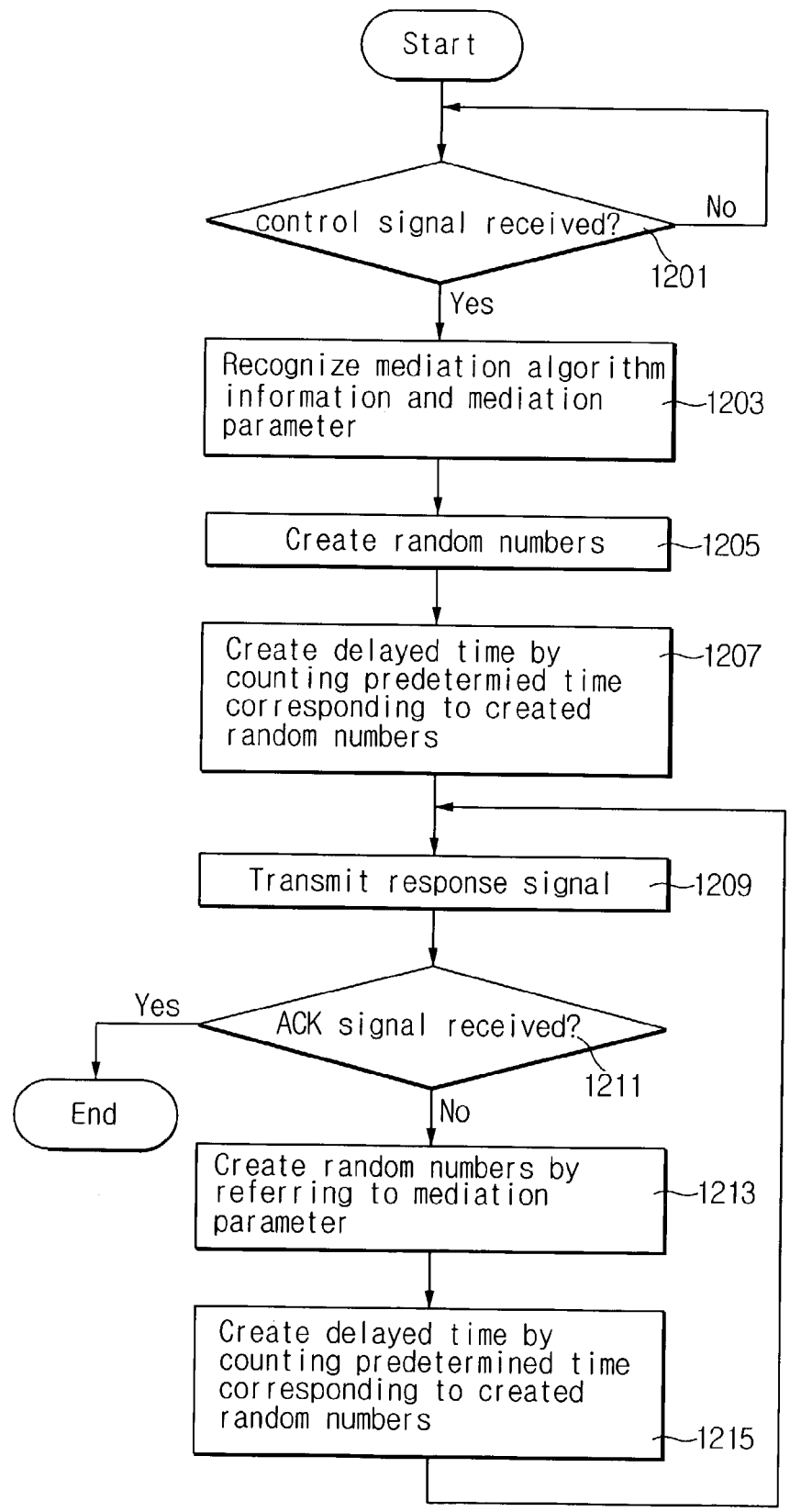
FIG. 12 is a flow chart illustrating operation steps of a transponder for use with a random delay count value mediation algorithm based on a delayed transmission scheme in accordance with the present invention.

FIG. 12 is a flow chart illustrating operation steps of a transponder for use with a random delay count value mediation algorithm based on a delayed transmission scheme in accordance with the present invention. The random delay count value mediation algorithm based on a delayed transmission scheme will hereinafter be described with reference to FIGS. 9 and 12.

The controller 703 determines whether a control signal is received from the RF transmitter/receiver 705 at step 1201. In the case where a moving object enters a communicable range, and a control signal is received from the controller 507, the controller 703 performs frame synchronization using frame synchronization information (shown in FIG. 8) contained in the control signal, and interprets the control signal. In this case, the controller 703 recognizes mediation algorithm information and a mediation parameter that are contained in the control signal at step 1203. The controller 703 provides the transmission time determination unit 707 with the recognized mediation parameter and mediation algorithm information.

If the mediation algorithm information indicates a random delay count value mediation algorithm based on a delayed transmission scheme, the transmission time determination unit 707 creates random numbers at step 1205, and counts the created random numbers to create a delayed time at step 1207. The transmission time determination unit 707 generates a transmission time determination signal. Therefore, the controller 703 receives the transmission time determination signal from the transmission time determination unit 707, creates a response signal, and wirelessly transmits the response signal to the controller 507 through the RF transmitter/receiver 705 at step 1209. The steps 1205 and 1207 correspond to the step 905 shown in FIG. 9.

The response signal may be transmitted for an uplink timeslot period. The response signal may include ID information of transponders. If the ACK signal generated from the controller 507 is received over the RF transmitter/receiver 705, the controller 703 provides the transmission time determination unit 707 with the ACK signal.

If the ACK signal is not received from the controller 507 within a prescribed time at step 1211, the transmission time determination unit 707 generates random numbers at step 1213 on the basis of a mediation parameter (i.e., a maximum count value) having been received from the controller 703 at step 1203. The transmission time determination unit 707 counts the created random number to create a delayed time at step 1215, and generates a transmission time determination signal.

Therefore, the controller 703 receives the transmission time determination signal from the transmission time determination unit 707, creates a response signal, and wirelessly outputs the response signal to the controller 507 through the RF transmitter/receiver 705 at step 1209. The steps 1213 and 1215 correspond to the step 905 (shown in FIG. 9) re-executed when no ACK signal is received within the prescribed time.

It is noted that the ACK signal does not additionally exist and ACK signal information may be contained in the next control signal of the controller 507 after the transmission time determination unit 707 transmits the response signal.

In the meantime, if the transmission time determination unit 707 receives the ACK signal from the controller 507 within a prescribed time at step 1211, the transmission time determination unit 707 informs the controller 703 of the ACK signal, such that the controller 703 is inactivated by the next control signal.

Figure 13:
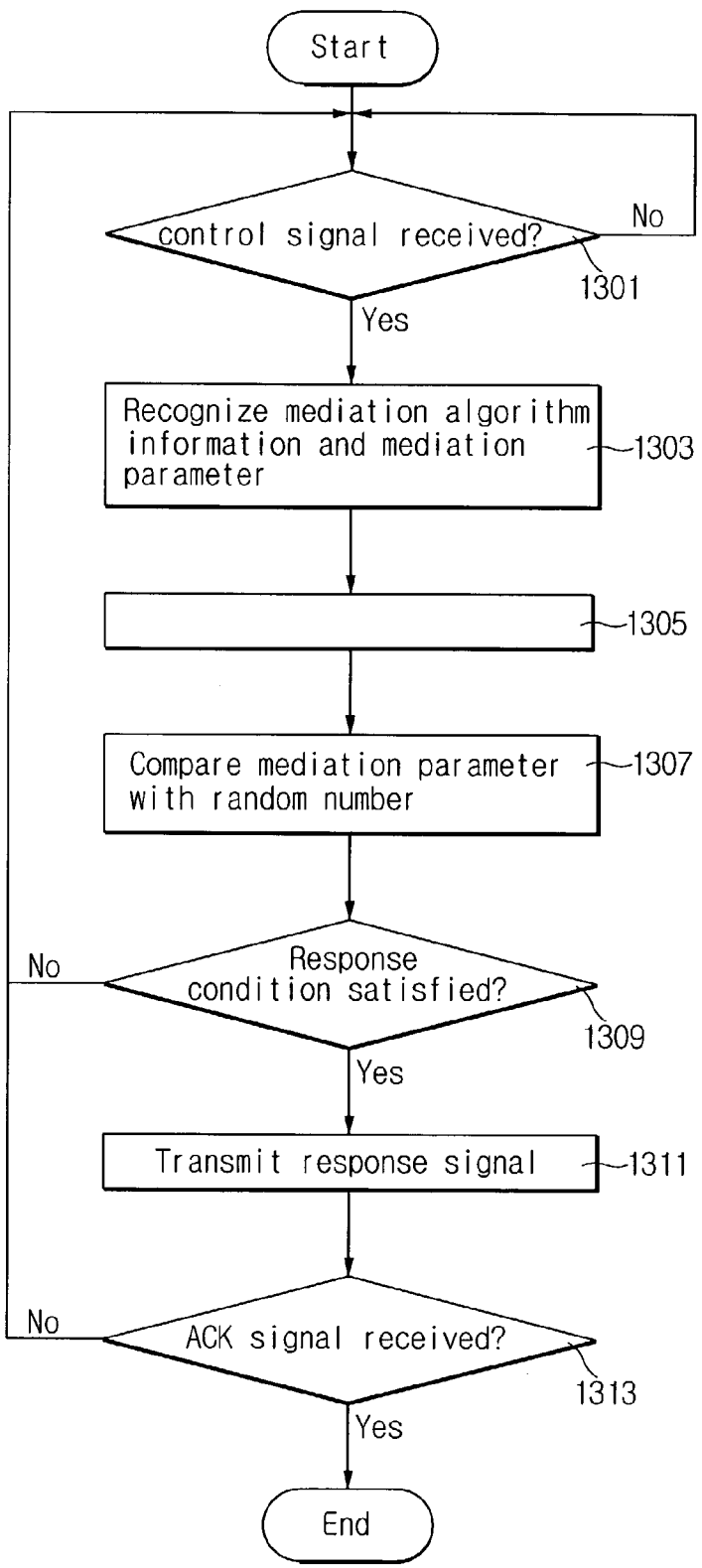
FIG. 13 is a flow chart illustrating operation steps of a transponder for use with a persistence-mediation algorithm in accordance with the present invention.

FIG. 13 is a flow chart illustrating operation steps of a transponder for use with a persistence-mediation algorithm in accordance with the present invention. The persistence mediation will hereinafter be described with reference to FIGS. 10 and 13.

The controller 703 determines whether a control signal is received from the RF transmitter/receiver 705 at step 1301. In the case where a moving object enters a communicable range, and a control signal is received from the controller 507, the controller 703 performs frame synchronization using frame synchronization information (shown in FIG. 8) contained in the control signal, and interprets the control signal. In this case, the controller 703 recognizes mediation algorithm information and a mediation parameter that are contained in the control signal at step 1303. The controller 703 provides the transmission time determination unit 707 with the recognized mediation parameter and mediation algorithm information.

If the mediation algorithm information indicates a persistence mediation algorithm, the transmission time determination unit 707 creates random numbers at step 1305, compares each of the created random numbers with the mediation parameter of the step 1303 at step 1307, and determines whether the comparison result of the step 1307 satisfies a predetermined response condition at step 1309. If the comparison result of the step 1307 does not satisfy the predetermined response condition at step 1309, the transmission time determination unit 707 creates a report signal indicating this unsatisfactory condition, such that the controller 703 returns to the step 1301 to wait for the next control signal.

If the comparison result of the step 1307 satisfies the predetermined response condition at step 1309, the transmission time determination unit 707 generates a transmission time determination signal. Therefore, the controller 703 receives the transmission time determination signal from the transmission time determination unit 707, creates a response signal, and wirelessly transmits the response signal to the controller 507 through the RF transmitter/receiver 705 at step 1311. The steps 1305, 1307, and 1309 correspond to the step 1105 shown in FIG. 10.

The response signal may be transmitted for an uplink timeslot period. The response signal may include ID information of transponders. If the ACK signal generated from the controller 507 is received over the RF transmitter/receiver 705, the controller 703 provides the transmission time determination unit 707 with the ACK signal.

If the ACK signal is not received from the controller 507 within a prescribed time at step 1313, the transmission time determination unit 707 generates a report signal indicating no ACK signal reception, such that the controller 703 returns to the step 1301 to wait for the next control signal.

In the meantime, if the transmission time determination unit 707 receives the ACK signal from the controller 507 within a prescribed time at step 1313, the transmission time determination unit 707 informs the controller 703 of the ACK signal reception, such that the controller 703 is inactivated by the next control signal.

It should be noted that the ACK signal does not additionally exist and ACK signal information may be contained in the next control signal of the controller 507 after the transmission time determination unit 707 transmits the response signal.

As apparent from the above description, the present invention enables a controller to recognize arrival rates of current moving objects, adds an optimum mediation parameter corresponding to the recognized arrival rates to a control signal, transmits the control signal having the optimum mediation parameter, and thereby reduces a communication miss rate regardless of a difference in numbers of the moving objects (i.e., traffic volume variation).

Because the controller recognizes arrival rates of current moving objects, and adds an optimum mediation parameter corresponding to the recognized arrival rates to the control signal, the present invention can dynamically provide transponders with the optimum mediation parameter and mediation algorithm information associated with the optimum mediation parameter according to variation of arrival rates of the moving objects, such that each transponder can selectively perform a mediation algorithm to which the optimum mediation parameter having the best performance in current arrival rates of the moving objects is applied.

In addition, the present invention classifies a mediation algorithm into a first mediation algorithm for employing mediation control information (i.e., a mediation parameter and mediation algorithm information) of a current reception control signal on the condition that a transponder does not receive an ACK signal within a predetermined time, and a second mediation algorithm for waiting for the next control signal and then employing mediation control information of the next control signal on the same condition as in the first algorithm, and performs an overall operation step of a transponder in such a way that an operation for checking the mediation algorithm information contained in the control signal is added to operations of the first and second mediation algorithms.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A communication mediation apparatus for allowing a controller to communicate with each transponder of a plurality of moving objects in a system for recognizing the moving objects using the controller communicating with the transponder contained in each of the moving objects, comprising:

an arrival rate sensor for recognizing each current arrival rate of the moving objects by counting the number of moving objects arriving within a predetermined time;
a memory for storing an optimum mediation parameter having the best performance for every arrival rate;
a selector for selecting an optimum mediation parameter corresponding to the current arrival rate; and
control means for adding the optimum mediation parameter corresponding to the selected current arrival rate to a control signal, and transmitting an acknowledge (ACK) signal within a communicable range upon receiving a response signal having no error from a corresponding transponder.

2. The apparatus as set forth in claim 1, wherein the memory further stores mediation algorithm information corresponding to the optimum mediation parameter, the selector further selects the mediation algorithm information stored in the memory, and the control means further adds the mediation algorithm information to the control signal.

3. A communication mediation apparatus for allowing each transponder of a plurality of moving objects to communicate with a controller in a system for recognizing the moving objects using the controller communicating with the transponder contained in each of the moving objects, comprising:

control means for receiving a control signal from the controller, recognizing a mediation parameter and mediation algorithm information associated with the mediation parameter that are contained in the control signal, transmitting a response signal to the controller upon receiving a transmission time determination signal, and determining whether an acknowledge (ACK) signal is received from the controller; and transmission time determination means for performing a mediation algorithm corresponding to the recognized mediation algorithm information, determining a transmission time of the response signal according to the mediation parameter and the result of indicating reception of the ACK signal within a predetermined period of time, and transmitting the transmission time determination signal.

4. A communication mediation method for allowing a controller to communicate with each transponder of a plurality of moving objects in a system for recognizing the moving objects using the controller communicating with the transponder contained in each of the moving objects, comprising the steps of:

a) recognizing each current arrival rate of the moving objects by counting the number of moving objects arriving within a predetermined time;
b) adding an optimum mediation parameter having the best performance in the recognized arrival rates of the moving objects to a control signal, and transmitting the control signal within a communicable range;
c) waiting for a response signal generated from a transponder; and
d) returning to the step (a), and transmitting an acknowledge (ACK) signal in the communicable range when a correct response signal is received within a predetermined time.

5. The method as set forth in claim 4, wherein the step (b) further includes the step of:

adding mediation algorithm information corresponding to the optimum mediation parameter to the control signal.

6. The method as set forth in claim 5, wherein the response signal and the ACK signal include identification (ID) information of a corresponding transponder.

7. The method as set forth in claim 4, wherein the response signal and the ACK signal include identification (ID) information of a corresponding transponder.

8. A communication mediation method for allowing each transponder of a plurality of moving objects to communicate with a controller in a system for recognizing the moving objects using the controller communicating with the transponder contained in each of the moving objects, comprising the steps of:

a) determining whether a control signal is received from the controller;
b) upon receiving the control signal, recognizing a mediation parameter and mediation algorithm information associated with the mediation parameter that are contained in the control signal;
c) determining a transmission time of a response signal according to a corresponding mediation algorithm;
d) enabling the controller to transmit a response signal;
e) if an acknowledge (ACK) signal is not received from the controller within a predetermined time, returning to the step (c), and re-transmitting the response signal; and
f) upon receiving the ACK signal from the controller within the predetermined time, controlling the transponder to be disabled by the next control signal received from the controller;
wherein the step (c) re-executed when the ACK signal is not received at the step (e) includes the steps of:
　c-1) generating random numbers on the basis of the mediation parameter; and
　c-2) creating a delayed time by counting a predetermined time corresponding to the created random numbers.

9. The method as set forth in claim 8, wherein the step (c) executed after performing the step (b) includes the steps of:
　c-3) generating random numbers; and
　c-4) creating a delayed time by counting a predetermined time corresponding to the created random numbers.

10. A method for mediating communication between a controller and each transponder of a plurality of moving objects in a system for recognizing the moving objects using the controller communicating with the transponder contained in each of the moving objects, comprising the steps of:
　a) determining whether a control signal is received from the controller;
　b) upon receiving the control signal, recognizing a mediation parameter and mediation algorithm information associated with the mediation parameter that are contained in the control signal;
　c) determining a transmission time of a response signal according to a corresponding mediation algorithm;
　d) transmitting the response signal to the controller;
　e) if an acknowledge (ACK) signal is not received from the controller within a predetermined time, returning to the step (a), and re-transmitting the response signal; and
　f) upon receiving the ACK signal from the controller within the predetermined time, controlling the transponder to be disabled by the next control signal received from the controller;
wherein the step (c) includes the steps of:
　c-1) generating random numbers;
　c-2) comparing the random numbers with the mediation parameter to determine whether a response signal transmission condition is satisfied;
　c-3) if the response signal transmission condition is satisfied, returned to the step (d); and
　c-4) if the response signal transmission condition is not satisfied, returning to the step (a).

\* \* \* \* \*